(12) United States Patent
Szczepanski (10) Patent No.: US 10,865,676 B1
(45) Date of Patent: Dec. 15, 2020

(54) EMISSION CONTROL SYSTEM (71) Applicant: DENSO International America, Inc., Southfield, MI (US)

(72) Inventor: Edward Szczepanski, Grosse Pointe Woods, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 16/505,131

(22) Filed: Jul. 8, 2019

(51) Int. Cl.
*F01N 3/023* (2006.01)
*F01N 3/20* (2006.01)
*F02D 41/02* (2006.01)
*F01N 9/00* (2006.01)
*F01N 3/10* (2006.01)

(52) U.S. Cl.
CPC ............ *F01N 3/023* (2013.01); *F01N 3/2026* (2013.01); *F01N 9/002* (2013.01); *F02D 41/0295* (2013.01); *F01N 3/101* (2013.01)

(58) Field of Classification Search
CPC ........ F01N 3/023; F01N 3/2026; F01N 9/002; F01N 3/101; F02D 41/0295; F02D 2200/0812; F02D 2200/0814; F02D 2200/0816
See application file for complete search history.

(56) References Cited

U.S. PATENT DOCUMENTS

| 6,874,313 | B2 | 4/2005 | Yurgil et al. |
| 8,833,060 | B2* | 9/2014 | Ruhland .................. F01N 3/023 60/274 |
| 10,364,716 | B2* | 7/2019 | Kaneko .................. F01N 3/2033 |
| 2008/0016857 | A1* | 1/2008 | Hu ......................... F01N 3/2803 60/299 |
| 2010/0192543 | A1* | 8/2010 | Fujiwara ............. F02D 41/0255 60/276 |
| 2014/0041362 | A1* | 2/2014 | Ulrey .................. F02D 41/0087 60/274 |
| 2017/0370268 | A1* | 12/2017 | Meier ..................... F01N 3/101 |
| 2018/0202336 | A1* | 7/2018 | Kaneko .................. F01N 3/0814 |
| 2018/0355774 | A1* | 12/2018 | Sudschajew ......... F01N 13/009 |
| 2019/0091628 | A1* | 3/2019 | Takayama ............... B01D 53/94 |
| 2019/0211725 | A1* | 7/2019 | Paukner ............. B01D 53/9454 |
| 2020/0072103 | A1* | 3/2020 | Sudschajew ........... F01N 3/023 |

FOREIGN PATENT DOCUMENTS

DE 102016119211 A1 4/2018
WO WO-2018024391 A1 2/2018

* cited by examiner

*Primary Examiner* — Jesse S Bogue
(74) *Attorney, Agent, or Firm* — Harness, Dickey & Pierce, P.L.C.

(57) ABSTRACT

An exhaust system includes a catalytic converter, a particulate filter, a first sensor, and a second sensor. The particulate filter is disposed downstream of the catalytic converter. The first sensor is disposed upstream of the catalytic converter and provides an output identifying a quantity of oxygen in an exhaust flow. The second sensor is disposed downstream of the catalytic converter and upstream of the particulate filter and provides an output identifying a quantity of oxygen in the exhaust flow exiting the catalytic converter.

18 Claims, 8 Drawing Sheets

EMISSION CONTROL SYSTEM

FIELD

The present disclosure relates to an emission control system, and, more particularly, a dual lambda sensor configuration for efficient particulate filter regeneration.

BACKGROUND

This section provides background information related to the present disclosure which is not necessarily prior art.

Internal combustion engines ("ICEs") typically draw ambient air into a combustion chamber where the air and a fuel are compressed by a compression device, such as a piston-cylinder for example, and ignited to cause combustion of the air-fuel mixture. The combustion gases generally expand to do work on the compression device, such as moving the piston to drive a crankshaft for example. The combustion gases are typically then expelled from the combustion chamber through an exhaust of the ICE. Combustion of the fuel in the ICE, such as diesel, gasoline, ethanol, or natural gas for example, typically results in emissions being released from the exhaust, such as NOx and particulate matter (e.g. soot).

An exhaust gas after-treatment system, for example including a catalytic converter such as a three-way catalyst (TWC), may be used to convert the primary pollutants in exhaust gas from automobiles into carbon dioxide, water and nitrogen. Catalytic converters contain material which store and release oxygen (O2) to aid the conversion. The O2 storage capacity (OSC) of a catalytic converter is a measure of its ability to reduce the negative effects of rich/lean oscillations in the exhaust gas composition through catalyzing a redox (oxidation or reduction) reaction.

SUMMARY

This section provides a general summary of the disclosure, and is not a comprehensive disclosure of its full scope or all of its features.

In one example embodiment of the present disclosure, an exhaust system includes a catalytic converter, a particulate filter, a first sensor, and a second sensor. The particulate filter is disposed downstream of the catalytic converter. The first sensor is disposed upstream of the catalytic converter and provides an output identifying a quantity of oxygen in an exhaust flow. The second sensor is disposed downstream of the catalytic converter and upstream of the particulate filter and provides an output identifying a quantity of oxygen in the exhaust flow exiting the catalytic converter.

The exhaust system may include a controller that receives the quantity of oxygen in the exhaust flow at the first sensor and the quantity of oxygen in the exhaust flow at the second sensor. The controller may determine an oxygen storage capacity of the catalytic converter and the particulate filter using the quantity of oxygen in the exhaust flow at the first sensor and the quantity of oxygen in the exhaust flow at the second sensor.

The controller may model the oxygen storage capacity from an intake air volume, an air-fuel ratio, and a stoichiometric air-fuel ratio.

The controller may maintain an oxygen storage capacity in the particulate filter of 50% during a normal operation phase, 20% during a pre-regeneration phase, and 80% during a regeneration phase.

The controller may command fueling to lean to fill the particulate filter with oxygen during a pre-regeneration phase.

The controller may command fueling to rich during a regeneration phase.

The first sensor and second sensor may be universal heated exhaust gas oxygen sensors.

The first sensor and second sensor may be lambda sensors.

The catalytic converter may be a three-way catalyst.

The exhaust system may include an aftertreament device disposed downstream the exhaust flow from the particulate filter.

An example method of controlling an exhaust system of the present disclosure includes: catalyzing, with a catalytic converter, hydrocarbons and nitrous oxide from an exhaust flow from an engine; filtering, with a particulate filter disposed downstream of the catalytic converter, particulate matter from the exhaust flow; detecting, with a first sensor disposed upstream of the catalytic converter, a quantity of oxygen in the exhaust flow; and detecting, with a second sensor disposed downstream of the catalytic converter and upstream of the particulate filter, a quantity of oxygen in the exhaust flow exiting the catalytic converter.

The example method may include determining, with a controller, an oxygen storage capacity of the catalytic converter and the particulate filter using the quantity of oxygen in the exhaust flow at the first sensor and the quantity of oxygen in the exhaust flow at the second sensor.

The example method may include modeling, with the controller, the oxygen storage capacity from an intake air volume, an air-fuel ratio, and a stoichiometric air-fuel ratio.

The example method may include maintaining, with the controller, an oxygen storage capacity in the particulate filter of 50% during a normal operation phase, 20% during a pre-regeneration phase, and 80% during a regeneration phase.

The example method may include commanding, with the controller, fueling to lean to fill the particulate filter with oxygen during a pre-regeneration phase.

The example method may include commanding, with the controller, fueling to rich during a regeneration phase.

The example method may include universal heated exhaust gas oxygen sensors as the first sensor and the second sensor.

The example method may further include: measuring, by the second sensor; the exhaust exiting the catalytic converter during regeneration; determining, by the controller, whether there will be enough oxygen to complete the regeneration based on the measurement from the second sensor; discontinuing, by the controller, the regeneration when there is not enough oxygen to complete the regeneration; fueling, by the controller, at a lean lambda condition to fill the catalytic converter and particulate filter with oxygen; and resuming, by the controller, regeneration when the catalytic converter and particulate filter are filled with oxygen.

The example method may further include: measuring, with at least one of the universal heated exhaust gas oxygen sensors, a pressure sensor, and a temperature sensor, a lambda, a temperature, or a pressure; determining, with the controller, whether regeneration will violate oxygen stored limits in the catalytic converter or the particulate filter; introducing, by the controller, a leaner exhaust condition either overall or in a timed interval to supply the remaining oxygen for regeneration.

The example method may include treating, with an aftertreament device disposed downstream from the particulate filter, the exhaust stream exiting the particulate filter.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module," the term "unit," or the term "controller" may be replaced with the term "circuit." The term "module" or the term "unit" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module or unit may include one or more interface circuits. In some examples, the interface circuits may include wired or wireless interfaces that are connected to a local area network (LAN), the Internet, a wide area network (WAN), or combinations thereof. The functionality of any given module or unit of the present disclosure may be distributed among multiple modules or units that are connected via interface circuits. For example, multiple modules or units may allow load balancing. In a further example, a server (also known as remote, or cloud) module or unit may accomplish some functionality on behalf of a client module or unit.

The term code, as used above, may include software, firmware, and/or microcode, and may refer to programs, routines, functions, classes, data structures, and/or objects. The term shared processor circuit encompasses a single processor circuit that executes some or all code from multiple modules or units. The term group processor circuit encompasses a processor circuit that, in combination with additional processor circuits, executes some or all code from one or more modules or units. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules or units. The term group memory circuit encompasses a memory circuit that, in combination with additional memories, stores some or all code from one or more modules or units.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The emission control system described herein provides an ability to model the oxygen storage capacity (OSC) in the light-off catalysts by utilizing universal heated exhaust gas oxygen (UHEGO) sensors (or lambda sensors) both upstream and downstream of a first catalytic converter (CC1) and upstream of a particulate filter (PF). The dual UHEGO sensors provide the ability to model the oxygen needed for both the CC1 and the PF to reduce emissions out of the CC1 and to efficiently burn the mass from the PF.

In the present application, the emission control system determines, rather than simply an occurrence of a lean event or a rich event, a quantity of how lean or how rich the event. The measurement of how lean or rich the event is performed in real time, reducing errors in fueling the system. Historically, the emission control system utilized a single UHEGO sensor at an engine out position, upstream of the catalytic converter. With the addition of the second UHEGO sensor at a position between the CC1 and the PF, the emission control system is able to build models for both the CC1 and the PF and make corrections to the models, for example to account for aging catalysts. Additionally, the emission control system is able to model the oxygen on hand in the PF to gain a clear understanding of what is needed during regeneration. Instead of burning particulates in the PF until the pressure decreases, prior to regeneration, the system understands how much oxygen is present in the PF and can command the engine to go lean on the CC1 just long enough to fill the PF in a controlled fashion, reducing waste.

Figure 1:
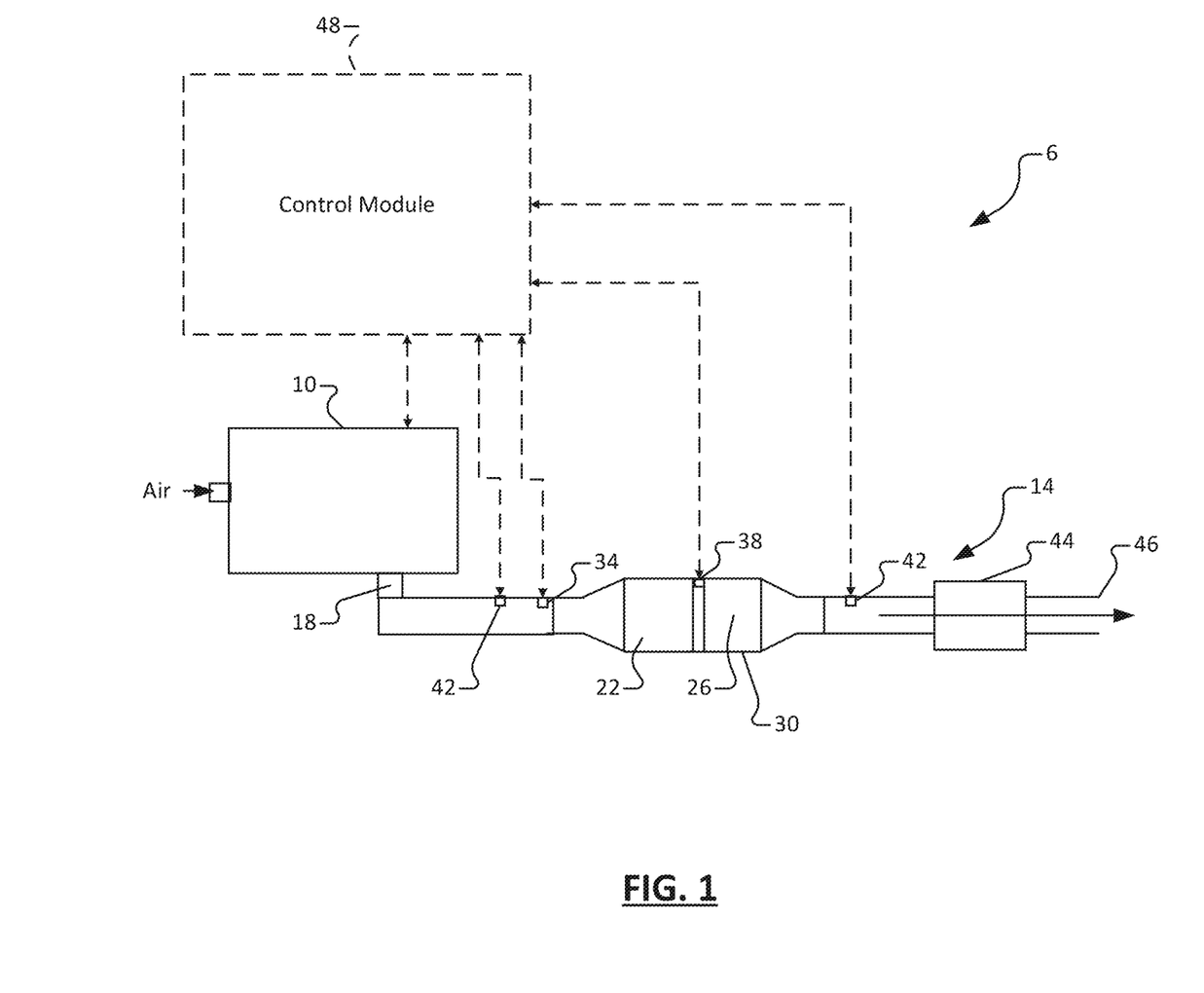
FIG. 1 is a schematic view of an example engine and emission control system according to the present disclosure.

Now referring to FIG. 1, an example emission control system 6 may include an engine 10 and exhaust assembly 14 according to the present disclosure. The engine 10 may be, for example, an internal combustion engine (ICE). The engine 10 may draw ambient air into a combustion chamber (not illustrated) where the air and a fuel are compressed by a compression device (not illustrated), such as a piston-cylinder for example. The air-fuel mixture may be ignited to cause combustion. The combustion gases expand to move the piston to drive a crankshaft, for example. The combustion gases may then be expelled from the combustion chamber through an exhaust port 18 of the ICE. The combustion gasses include emissions, for example nitrogen oxide (NOx), hydrocarbons (HC), carbon monoxide (CO), and particulate matter (e.g. soot). In some embodiments, the engine 10 may be, for example, a diesel engine (or a compression-ignition engine) where the fuel injected into the combustion chamber is ignited by the elevated temperature of the air in the cylinder due to mechanical compression.

The exhaust assembly 14 may include a catalytic converter 22 (CC1). For example, the catalytic converter 22 may be a three-way catalyst (TWC) to convert the primary pollutants (i.e., NOx, CO, HC, etc.) into carbon dioxide, water and nitrogen. Catalytic converters 22 decrease the emissions or pollutants by catalyzing a reaction (oxidation or reduction) to break down the emissions. For example, the TWC simultaneously reduces the nitrous oxide (NOx) while oxidizing the hydrocarbons (HC) and carbon monoxide (CO). Catalytic converters 22 contain material which stores and releases oxygen (O2) to aid the conversion. For example, the catalytic converter 22 may be formed of a precious metal such as platinum, palladium, rhodium, or a combination thereof, and may contain Cerium IV oxide ($CeO_2$), also referred to as Ceria (Ce), in which the oxygen is stored. An Oxygen Storage Capacity (OSC) of the catalytic converter 22 indicates an amount of oxygen stored in the material of the catalytic converter 22.

In some embodiments, the catalytic converter 22 is a three-way catalyst (TWC) having a substrate coated with precious group metals (for example, platinum, palladium, rhodium) used to catalyze exhaust gasses from hydrocarbons (HC), carbon monoxide (CO), and nitrous oxide (NOx) to nitrogen ($N_2$), water ($H_2O$), and carbon dioxide ($CO_2$). The TWC may also be coated with oxygen ($O_2$) storage promoters to store and release oxygen ($O_2$) as an exhaust lambda (the measurement of the proportion of oxygen $O_2$ in the exhaust gas) fluctuates around stoichiometry (lambda=1). If the TWC overfills with oxygen ($O_2$), then nitrous oxide (NOx) reduction will be retarded (i.e., decreased). If the TWC empties too much oxygen ($O_2$), then oxidation of hydrocarbons (HC) will be retarded (i.e., decreased). Accordingly, the system must manage oxygen storage capacity (OSC) for the TWC to optimally convert hydrocarbons (HC), carbon monoxide (CO), and nitrous oxide (NOx) to nitrogen ($N_2$), water ($H_2O$), and carbon dioxide ($CO_2$).

The exhaust assembly 14 may also include a particulate filter (PF) 26 to remove particulate matter or soot from the exhaust gas of the engine 10. The particulate filter 26 may be positioned downstream of the catalytic converter 22. The catalytic converter 22 and particulate filter 26 may be housed together in a single canister 30 or may be separately housed within the exhaust assembly 14.

Particulate filters 26 decrease particulate matter in the emissions by burning of the particulate matter either passively through the use of a catalyst or by active means. For example, in diesel systems, a fuel burner which heats the filter to particulate matter (soot) combustion temperatures (for example only, approximately 600° C.±10° C.). For gasoline engines, a control system may move the lambda, or measurement of the proportion of oxygen $O_2$ in the exhaust gas, rich to increase a temperature of exhaust gas to regeneration levels. While gasoline engines are illustrated and discussed in the present disclosure, it is understood that the same principles may be applied to diesel systems.

For example, the particulate filter 26 collects particulate matter in the emissions. When the particulate filter 26 is full, or particulate matter is greater than a threshold (for example, 60%), the engine (through programming) elevates the temperature of the exhaust and fuel is injected into the particulate filter 26 to react with a catalyst element to burn off the accumulated particulate matter. For example, the particulate filter 26 material may be a honeycomb structure of cordierite, silicon carbide, ceramic fiber, metal fiber, or combinations thereof.

To oxidize particulate matter (soot), sufficient oxygen (further described below) is required to be present in the particulate filter 26 during regeneration. An Oxygen Storage Capacity (OSC) of the particulate filter 26 indicates an amount of oxygen stored in the material of the particulate filter 26.

The exhaust assembly 14 may further include an upstream sensor 34 and a downstream sensor 38. The upstream sensor 34 is positioned on an upstream side of the catalytic converter 22, and the downstream sensor 38 is positioned downstream of the upstream sensor 34, on an upstream side of the particulate filter 26 and a downstream side of the catalytic converter 22, to measure an air-fuel ratio or a quantity of oxygen in the exhaust flow before and after the catalytic converter 22. For example, the upstream sensor 34 and the downstream sensor 38 may each be lambda sensors, or universal heated exhaust gas oxygen (UHEGO) sensors.

The upstream sensor 34 may measure a quantity of oxygen in the exhaust flow or an air-fuel ratio of the exhaust flow in the exhaust stream exiting the engine 10. The downstream sensor 38 may measure a quantity of oxygen in the exhaust flow or an air-fuel ratio of the exhaust flow in the exhaust stream exiting the catalytic converter 22 and/or entering the particulate filter 26.

Additional sensors 42 may also be placed upstream and downstream from the catalytic converter 22 and particulate filter 26. For example, the additional sensors 42 may measure temperature, CO emissions, NOx emissions, HC emissions, particulate matter, etc.

In an example embodiment, an aftertreatment device 44 may be disposed downstream of the catalytic converter 22 and particulate filter 26. The aftertreatment device 44 may be configured to treat exhaust flow exiting the particulate filter 26. For example, the aftertreatment device 44 may treat exhaust flow to reduce an amount of one or more substances in the exhaust flow. In some embodiments, the aftertreatment device 44 may be a three-way catalyst (TWC). Upon exiting the aftertreatment device 44, all or part of the treated and/or filtered exhaust may be released via an exhaust conduit 46.

A control module 48 may communicate with the various sensors 34, 38, 42 to control the components of the engine 10 and exhaust assembly 14. In this application, the term "module" or "unit" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The control module 48 may execute methods for controlling the engine 10 and emission control system 6 based on instructions that may be stored in a memory of the control module 48 and in conjunction with signals received from various sensors in the engine 10 and emission control system 6, such as the sensors described with reference to FIG. 1. The control module 48 may control actuators within the engine 10 and emission control system 6 to adjust engine operation according to the methods described hereafter.

The control module 48 may manage the oxygen levels in both the catalytic converter 22 and the particulate filter 26 by understanding the condition of the exhaust flow exiting the engine 10 from the upstream UHEGO or lambda sensor 34 and the condition of the exhaust flow exiting the catalytic converter 22 from the downstream, or second, UHEGO or lambda sensor 38.

Figure 2:
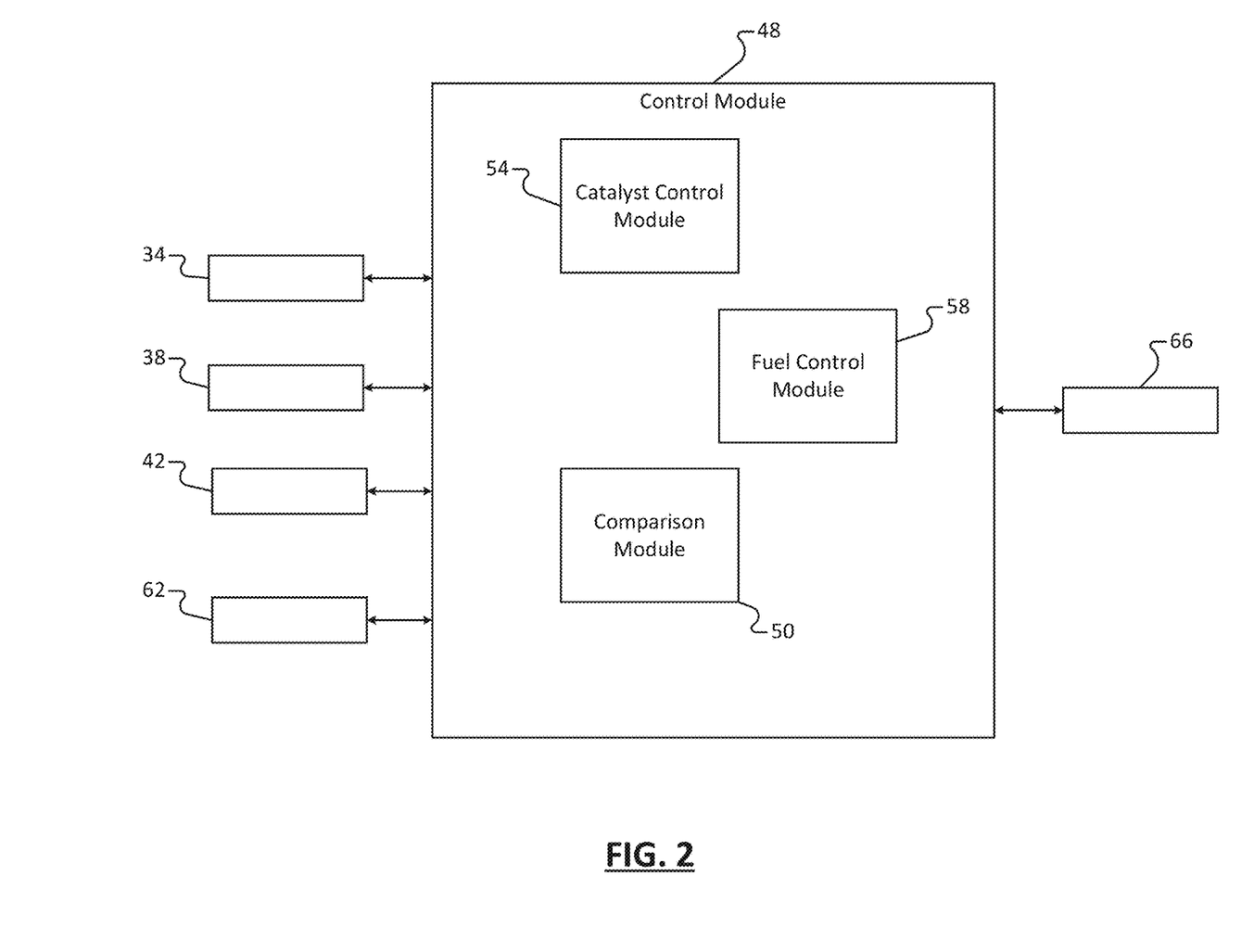
FIG. 2 is a schematic view of the emission control system in FIG. 1.

Now referring to FIG. 2, the control module 48 may include a comparison module 50, a catalyst control module 54, and a fuel control module 58. The comparison module 50 may communicate with sensors 34, 38, 42 and various other sensors or inputs 62 (for example, vehicle speed, steering wheel position, engine speed, engine load, etc.) to determine a current engine condition. Although it is not necessary, in some embodiments sensors/inputs 62 may be communicated to the control module 48 through a control area network (CAN) or other vehicle communication network. For example, sensors/inputs 62, a comparison of outputs of the sensors 34, 38, 42 or a combination of these may provide a current engine control state (such as normal, lean, or rich for example).

The upstream sensor 34 may report a quantity of oxygen in the exhaust flow or an air-fuel ratio of the exhaust flow in the exhaust stream exiting the engine 10 to the comparison module 50, and the downstream sensor 38 may report a quantity of oxygen in the exhaust flow or an air-fuel ratio of the exhaust flow in the exhaust stream exiting the catalytic converter 22 to the comparison module 50.

The comparison module 50 may compare output signals from the various sensors or inputs 34, 38, 42, 62 to thresholds to indicate a state of operation or changes within the system. For example, the comparison module 50 may evaluate an output signal from the upstream UHEGO sensor 34 and/or the downstream UHEGO sensor 38 to determine lean, rich, or stoichiometric fueling. The evaluation may also provide a quantity of how lean or how rich the fueling, respectively.

The catalyst control module 54 may receive the outputs from the upstream sensor 34 and downstream sensor 38 from the comparison module 50 and may determine an oxygen storage capacity (OSC) for each of the catalytic converter 22 and the particulate filter 26. Specifically, the quantity of oxygen in the exhaust flow or an air-fuel ratio of the exhaust flow in the exhaust stream exiting the engine 10 provided by the upstream sensor 34 may be used to determine the OSC of the catalytic converter 22, and the quantity of oxygen in the exhaust flow or an air-fuel ratio of the exhaust flow in the exhaust stream exiting the catalytic converter 22 provided by the downstream sensor 38 may be used to determine the OSC of the particulate filter 26. Additionally, the catalyst control module 54 may utilize oxygen management formations and modeling to determine the OSC for the catalytic converter 22 and the particulate filter 26. For example, the catalyst control module 54 may use formulations such as:

$$O_{in} = Ga\left[\frac{g}{s}\right] * \frac{AF - AF_{st}}{AF_{st}} * 0.232 * dt$$

where Ga is the intake air volume in grams per second (g/s), AF is the air-fuel ratio (A/F[–]) before the catalyst, and $AF_{st}$ is the catalyst stoichiometric air-fuel ratio (A/F[–]). The constant 0.232 represents the oxygen in the atmosphere, where air is pulled into the engine. While 0.232 is used in the above equation, it is understood that this number may be changed (for example, typically, oxygen ($O_2$) is recognized as comprising 21% of the atmosphere) based on the atmosphere or other variables.

The catalyst control module 54 may impose limits on the OSC for each of the catalytic converter 22 and particulate filter 26 such that the level of oxygen maintained in the catalyst can be managed within a safety margin for overfilling or over emptying. For example, the maximum limit on the OSC for each of the catalytic converter 22 and particulate filter 26 may be within a range of 80-100% and 60%-90%, respectively, and more specifically may be about 100% and 90% (plus or minus 5%), respectively. The minimum limit on the OSC for each of the catalytic converter 22 and particulate filter 26 may be within a range of 0-20% and 10%-40%, respectively, and more specifically may be about 0% and 10% (plus or minus 5%), respectively. When a catalyst is overfilled with oxygen, the catalyst cannot reduce NOx to nitrogen ($N_2$) and oxygen ($O_2$). Rhodium in the catalyst attracts oxygen in the NOx, and if the catalyst is full, the rhodium can't attract the oxygen to break down the NOx. When a catalyst is underfilled, the catalyst cannot break down hydrocarbons (HC) into water ($H_2O$) and carbon dioxide ($CO_2$).

The catalyst control module 54 and comparison module 50 may both communicate with the fuel control module 58 to provide necessary inputs for the fuel control module 58 to model and control fueling of the engine 10. For example, during various phases of engine operation (FIGS. 3 and 5A-5C) the fuel control module 58 controls the fueling to target lean fueling or rich fueling in order to prepare the catalytic converter 22 and particulate filter 26 for regeneration and to execute regeneration. During normal operation, the fuel control module 58 controls the fueling to target a stoichiometric air-fuel ratio (i.e. lambda=1) to maintain the desired OSC in the catalytic converter 22 and particulate filter 26 and efficiently catalyze exhaust gasses from hydrocarbons (HC), carbon monoxide (CO), and nitrous oxide (NOx) to nitrogen ($N_2$), water ($H_2O$), and carbon dioxide ($CO_2$).

Referring to FIGS. 3 and 5A-5C, regeneration is necessary to burn off particulate matter stored within the particulate filter 26. The particulate filter 26 is a filter that traps particulate matter in the exhaust flow from the engine 10. The particulate filter 26 must be emptied regularly to maintain its performance. The cleaning process for the particulate filter 26 is termed regeneration. During regeneration, the accumulated particulate matter is burnt off at high temperature (for example, greater than 500° C., and, more particularly approximately 600° C., ±50° C.). The product of regeneration leaves only a residue of ash, effectively cleaning the particulate filter 26 such that it can trap particulate matter from the exhaust flow.

Figure 3:
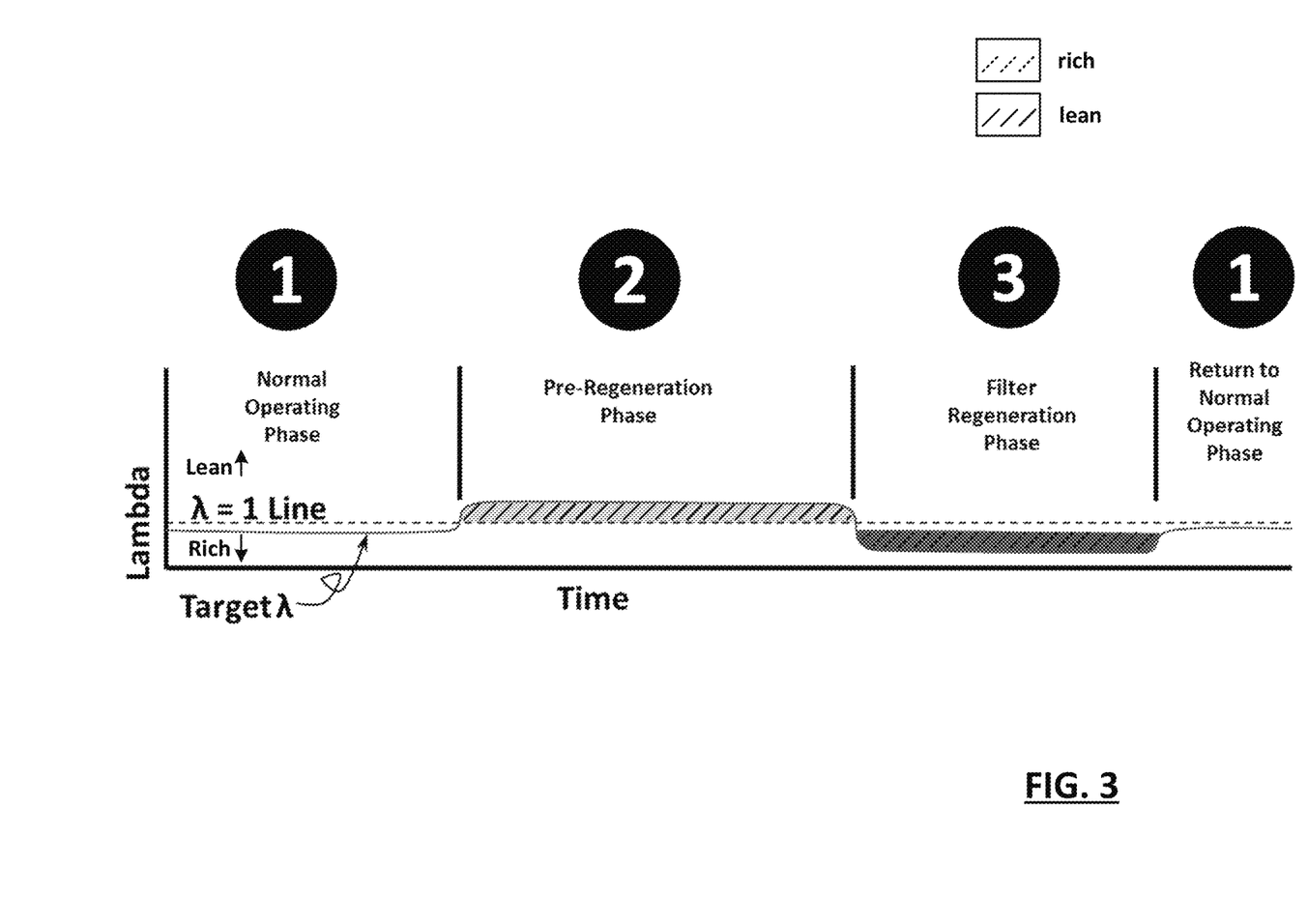
FIG. 3 is a graphical view of phases of emission control.
Figure 5A:
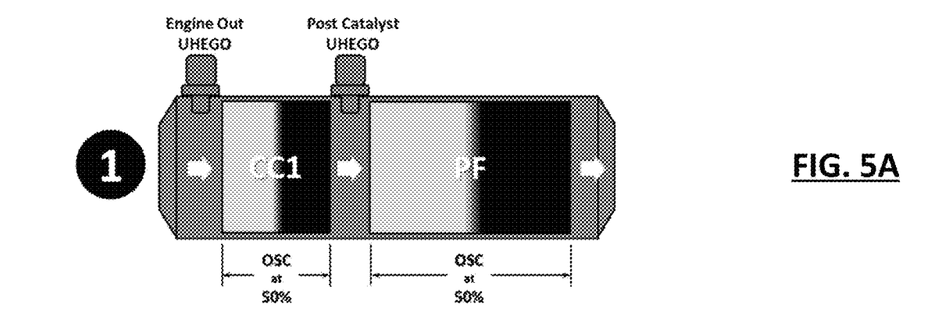
FIGS. 5A-5C are illustrations of a catalytic converter and a particulate filter during each phase of FIG. 3.

The regeneration cycle is comprised of several phases as illustrated in FIGS. 3 and 5A-5C. During normal operation, the engine 10 and fueling are operating in a normal operating phase, for example, phase 1 in FIGS. 3 and 5A. Referring to FIG. 3, during the normal operating phase, the air-fuel ratio, or lambda, is controlled to target 1 or slightly rich (i.e., below the lambda=1 line). For example, the control module 48, or fuel control module 58, targets fueling to achieve the lambda=1, or slightly rich lambda <1, air-fuel-ratio. As shown in FIG. 5A, during the normal operating phase, the oxygen storage capacity (OSC) for both the catalytic converter 22 and the particulate filter are maintained at about half full, for example the OSC for both the catalytic converter 22 and the particulate filter 26 are maintained at 50% (±10%). While these example embodiments are illustrated, it is understood that different applications may have different normal operation capacity percentages for safety margins or other reasons, and thus, the percentage value may vary in the range of ±20% or more.

Figure 4:
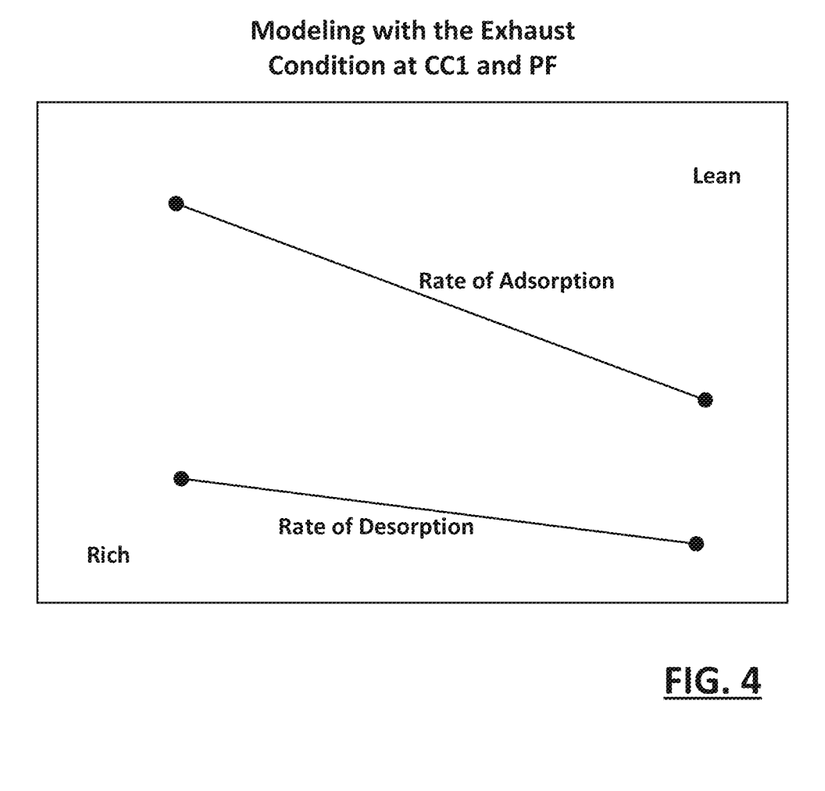
FIG. 4 is a graphical representation of a model of the exhaust system in FIG. 1.
Figure 5B:
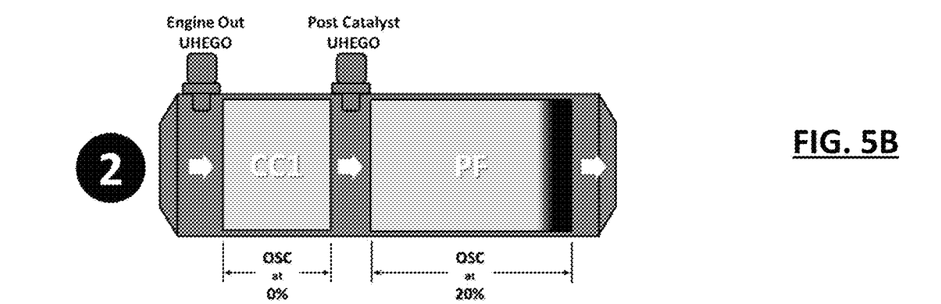

When the need to regenerate is identified, the system operates in a pre-regeneration phase, as shown, for example, as phase 2 in FIGS. 3 and 5B. Referring to FIG. 3, during the pre-regeneration operating phase, the air-fuel ratio, or lambda, is controlled to target lean fueling, or lambda >1 (i.e., above the lambda=1 line). For example, the control module 48, or fuel control module 58, targets fueling to achieve the lean air-fuel ratio. The highlighted area in phase 2 is developed and executed based on a model which understands the amount of oxygen storage capacity for each of the catalytic converter 22 and particulate filter 26. Further, the model understands the reaction rate of adsorption versus desorption of oxygen into and out of each catalytic converter 22 and particulate filter within a variety of exhaust conditions, for example, as shown in FIG. 4.

FIG. 4 illustrates that the rate of adsorption decreases at a faster rate than the rate of desorption when moving from rich to lean control. The model understands the relationship in FIG. 4 from past lean and rich conditions. A history is accumulated of how much the particulate filter or three-way catalyst adsorbs or desorbs in rich and in lean conditions based on ceria, rhodium, and palladium in each brick. Based on where the lines are set for each engine condition, the amount of oxygen is coming in, able to be absorbed, and how much is retained in the brick is known.

Phase 2 and the highlighted area of phase 2 allows a targeted abundance of oxygen in the exhaust for a designated set of time. This allows the particulate filter 26 to absorb sufficient oxygen to support oxidation of the modelled material currently trapped in the particulate filter 26. It further allows sufficient oxygen to be stored in the particulate filter 26 for the duration of the upcoming rich regeneration event. This protects against untreated hydrocarbons passing through the aftertreatment device 46 to the tailpipe 48.

As shown in FIG. 5B, during the pre-regeneration phase, the oxygen storage capacity (OSC) for the catalytic converter 22 and the particulate filter 26 is maintained at a minimum, for example the catalytic converter 22 OSC is maintained at about 0% (±10%) and the OSC for the particulate filter 26 is maintained at about 20% (±10%). While these example embodiments are illustrated, it is understood that different applications may have different minimum capacity percentages for safety margins or other reasons, and thus, the percentage value may vary in the range of ±20% or more.

At an end of the pre-regeneration phase, the catalytic converter 22 has sufficient supply of oxygen to oxidize the increase in un-combusted and partially combusted hydrocarbons during the rich regeneration event by utilizing the same modeling process.

Figure 5C:
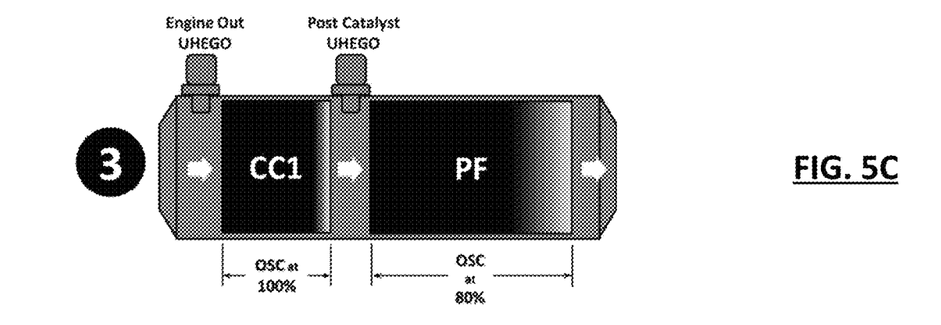

During particulate filter 26 regeneration, the system operates in a filter regeneration phase, as illustrated as phase 3 in FIGS. 3 and 5C. Referring to FIG. 3, during filter regeneration phase, the air-fuel ratio, or lambda is controlled to target rich fueling, or lambda <1 (i.e., below the lambda=1 line). For example, the control module 48, or fuel control module 58, targets fueling to achieve the rich air-fuel ratio. The rich air-fuel ratio adds unburned fuel to the particulate filter 26 which reacts with the heated exhaust gas (for example, at approximately 600° C., ±10° C.) to burn the particulate matter trapped in the particulate filter 26.

As illustrated in FIG. 5C, the oxygen storage capacity (OSC) for the catalytic converter 22 and the particulate filter 26 is a maximum, for example the catalytic converter 22 OSC is maintained at about 100% (±10%) and the OSC for the particulate filter 26 is maintained at about 80% (±10%). While these example embodiments are illustrated, it is understood that different applications may have different maximum capacity percentages for safety margins or other reasons, and thus, the percentage value may vary in the range of ±20% or more.

Referring again to FIG. 2, upon determining the appropriate fueling and phase, the fuel control module 58 commands various actuators 66 to execute engine 10 operation to the targeted phase and fueling.

In some example embodiments, there may be several reasons, one of which could prevent regeneration from completing. These reasons may include a scenario where different fueling is necessary, such as load changes (for example, driving up a hill), or a scenario where there is not enough oxygen present to complete the regeneration (the delta pressure across the particulate filter indicates the regeneration progress and temperature sensors indicate, by the change in exothermic heat, the amount of regeneration time left to occur). If there is not enough oxygen to complete the regeneration, the fuel control module 58, together with the catalyst control module 54 and comparison module 50, may discontinue the regeneration event and return the system to operation in the pre-regeneration phase until sufficient oxygen has been stored.

In some embodiments, if the control module 48 (using the UHEGO sensor and delta pressure and/or temperature sensor) determines that regeneration will violate oxygen ($O_2$) stored limits in the catalytic converter 22 or particulate filter 26, then by estimation of how much time and amount of soot is remaining to be oxidized, the ECU may continue regeneration, but introduce leaner exhaust conditions overall or in timed intervals to supply the estimated amount of oxygen that would be needed to complete regeneration without having to cease regeneration and restart it again after supplying the same required amount of oxygen.

Figure 6:
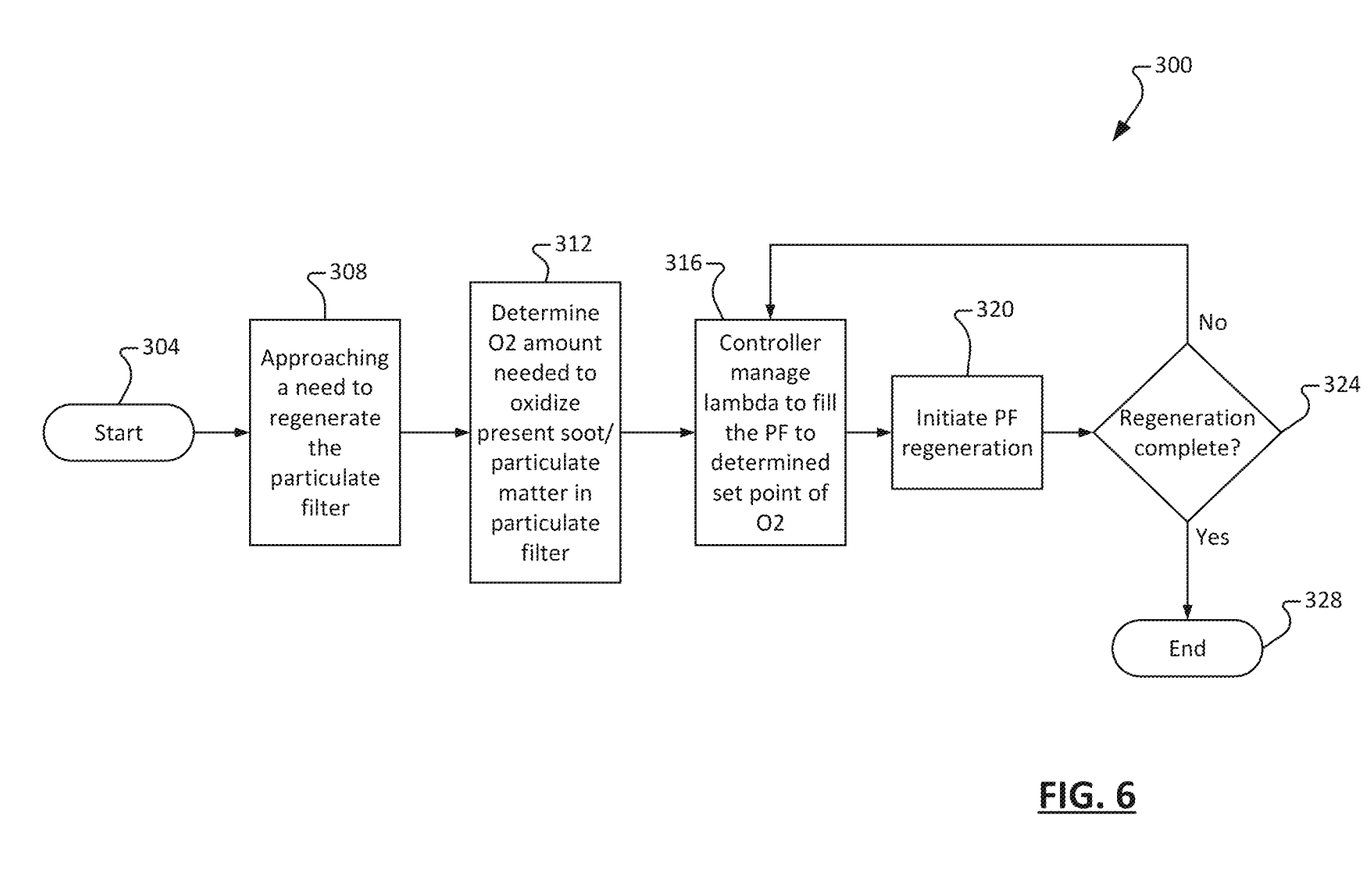
FIG. 6 is a flowchart for an example method for operating the emission control system of FIG. 1.

Now referring to FIG. 6, an example method for operating the emission control system 6, specifically during particulate filter regeneration is illustrated. Method 300 starts at 304. At 308, the method 300 determines that there is an approaching need to regenerate the particulate filter 26. For example, the control module 48 (such as the comparison module 50, for example) may determine that the particulate filter 26 is approaching "full." The particulate filter 26 may be full when an amount of particulate matter trapped within the particulate filter 26 exceeds a threshold capacity. In some embodiments, the threshold capacity may be within a range of 50%-90% total capacity, and, more particularly within a range of 60%-75% total capacity. For example, at 1 liter, the particulate filter 26 may have a maximum soot limit of 4.5 grams. However, the threshold capacity may be set to 3 grams. If the particulate filter 26 is allowed to exceed the soot threshold capacity, the exothermic reactions that occur during regeneration may induce thermal run away and damage, melting of the wall, and wall cracking.

The particulate matter (soot) accumulation may be determined based on a pressure drop across the particulate filter 26. For example, a sensed pressure upstream of the particulate filter 26 may be compared with a sensed pressure downstream of the particulate filter 26. In alternate embodiments, particulate matter accumulation may be modeled based on engine operating conditions. Such engine operating conditions may include engine speed, engine load, periods of engine operation, periods of rich operation, number of cold starts, etc.

In some embodiments, the engine operating conditions may be estimated, calculated, or otherwise determined. For example, the engine operating conditions may include engine speed, engine load, driver torque demand, ambient temperature, ambient humidity, ambient barometric pressure, manifold absolute pressure (MAP), manifold air flow (MAF), manifold air temperature (MAT), engine temperature, boost level, air-fuel ratio, etc.

In some embodiments, the particulate matter accumulation may be determined from the engine operating conditions. For example, measuring a number and length (frequency and duration) of engine events (such as cold starts, deep enrichment, operation with compression injection, etc.) resulting in the release of particulate matter may be used to determine and track the load on the particulate filter 26. A time and duration of lean operation while the particulate filter 26 is hot (for example, greater than 600° C., ±50° C.) and taking into consideration the mass of oxygen flowing through the filter may be subtracted from the engine events to estimate particulate load on the particulate filter 26.

Prior to identifying the approaching need to regenerate the particulate filter 26, the engine and fueling are operating in a normal operating phase, for example, phase 1 in FIGS. 3 and 5A. Referring to FIG. 3, during the normal operating phase, the air-fuel ratio, or lambda is controlled to target 1, or slightly rich (i.e., slightly below the lambda=1 line). For example, the control module 48, or fuel control module 58, targets fueling to achieve the lambda=1, or slightly rich, air-fuel ratio. As shown in FIG. 5A, during the normal operating phase, the oxygen storage capacity (OSC) for both the catalytic converter 22 and the particulate filter are maintained at half full, for example the OSC for both the catalytic converter 22 and the particulate filter 26 are maintained at 50%. While these example embodiments are illustrated, it is understood that different applications may have different normal operation capacity percentages for safety margins or other reasons, and thus, the percentage value may vary in the range of ±20% or more.

At 312, the method 300 determines the amount of oxygen ($O_2$) needed to oxidize the present particulate matter in particulate filter 26. The amount of oxygen needed for oxidation varies based on an amount of particulate matter in the particulate filter 26. In some embodiments, the amount of material needed to be oxidized during an upcoming particulate filter regeneration event can be modeled understanding, for example, current system pressure difference (ΔP), extent of recent rich events, resonance frequency of the filter, system temperatures, or other known methods.

For example, in some embodiments, if 3 grams of particulate matter are trapped for oxidation, 6 grams of oxygen may be necessary to oxidize the particulate matter. To fully oxidize the soot (mostly carbon) to $CO_2$, 1 carbon (C) and 2 oxygen atoms are necessary (to form the $CO_2$). Thus, if there are 3 grams of soot (carbon), then 6 grams of oxygen (i.e., 2 times the amount of carbon) are necessary.

For example, the oxygen needed to oxidize the present particulate matter in particulate filter 26 may be modeled using the following equation:

$$O_{in} = Ga\left[\frac{g}{s}\right] * \frac{AF - AF_{st}}{AF_{st}} * 0.232 * dt$$

where Ga is the intake air volume in grams per second (g/s), AF is the air-fuel ratio (A/F[-]) before the catalytic converter 22, and $AF_{st}$ is the catalytic converter stoichiometric air-fuel ratio (A/F[-]). The constant 0.232 represents the oxygen in the atmosphere, where air is pulled into the engine. While 0.232 is used in the above equation, it is understood that this number may be changed (for example, typically, oxygen ($O_2$) is recognized as comprising 21% of the atmosphere) based on the atmosphere or other variables.

At 316, the lambda, or air-fuel ratio, is managed to fill the particulate filter 26 to the determined set point of oxygen needed to oxidize the present particulate matter in particulate filter 26. For example only, the control module 48, and more specifically, the fuel control module 58, may command the fueling to a lean state to fill the particulate filter 26 with oxygen.

When the need to regenerate is identified, the system operates in a pre-regeneration phase, as shown, for example, as phase 2 in FIGS. 3 and 5B. Referring to FIG. 3, during the pre-regeneration operating phase, the air-fuel ratio, or lambda, is controlled to target lean fueling (i.e., above the lambda=1 line). For example, the control module 48, or fuel control module 58, targets fueling to achieve the lean air-fuel ratio. The highlighted area in phase 2 is developed and executed based on a model which understands the amount of oxygen storage capacity for each of the catalytic converter 22 and particulate filter 26. Further, the model understands the reaction rate of adsorption vs desorption of oxygen into and out of each catalytic converter 22 and particulate filter within a variety of exhaust conditions, for example, as shown in FIG. 4. FIG. 4 illustrates that the rate of adsorption decreases at a faster rate than the rate of desorption when moving from rich to lean control.

The pre-regeneration phase, phase 2, and the highlighted area of phase 2 allows a targeted abundance of oxygen (for example, because of the presence of the rear UHEGO) in the exhaust for a designated set of time. This allows the particulate filter 26 to absorb sufficient oxygen to support oxidation of the modelled material currently trapped in the particulate filter 26. It further allows sufficient oxygen to be stored in the particulate filter 26 for the duration of the upcoming rich regeneration event. This protects against untreated hydrocarbons passing through the aftertreatment device 46 to the tailpipe 48.

As shown in FIG. 5B, during the pre-regeneration phase, the oxygen storage capacity (OSC) for the catalytic converter 22 and the particulate filter 26 is maintained at a minimum, for example the catalytic converter 22 OSC is maintained at about 0% (±5%) and the OSC for the particulate filter 26 is maintained at about 20% (±10%). While these example embodiments are illustrated, it is understood that different applications may have different minimum storage capacity percentages for safety margins or other reasons, and thus, the percentage value may vary in the range of ±20% or more. In other words, the oxygen stored in the catalytic converter 22 may be at full capacity, or about 100% (±10%) full, and the oxygen stored in the particulate filter 26 may be at full capacity, or about 80% (±10%) full.

At an end of the pre-regeneration phase, the catalytic converter 22 has sufficient supply of oxygen to oxidize the increase in un-combusted and partially combusted hydrocarbons during the rich regeneration event by utilizing the same modeling process.

At 320, particulate filter 26 regeneration is initiated. For example, control module 48 begins regeneration. During particulate filter 26 regeneration, the system operates in a filter regeneration phase, as illustrated as phase 3 in FIGS.

3 and 5C. Referring to FIG. 3, during filter regeneration phase, the air-fuel ratio, or lambda is controlled to target rich fueling (i.e., below the lambda=1 line). For example, the control module 48, or fuel control module 58, targets fueling to achieve the rich air-fuel ratio. The rich air-fuel ratio adds unburned fuel to the particulate filter 26 which reacts with the heated exhaust gas (for example, at approximately 600° C., ±10° C.) to burn the particulate matter trapped in the particulate filter 26.

As illustrated in FIG. 5C, the oxygen storage capacity (OSC) for the catalytic converter 22 and the particulate filter 26 is a maximum, for example the catalytic converter 22 OSC is maintained at about 100% (±10%) and the OSC for the particulate filter 26 is maintained at about 80% (±10%). While these example embodiments are illustrated, it is understood that different applications may have different maximum storage capacity percentages for safety margins or other reasons, and thus, the percentage value may vary in the range of ±20% or more. In other words, the oxygen stored in the catalytic converter 22 may be at minimum capacity, or about 0% (±5%) full (i.e., empty), and the oxygen stored in the particulate filter 26 may be at minimum capacity, or about 20% (±10%) full (i.e., almost empty).

At 324, method 300 determines whether the regeneration was completed. For example, the control module 48 may determine whether regeneration has been completed. In some example embodiments, there may be several reasons, one of which could prevent regeneration from completing. These reasons may include a scenario where different fueling is necessary, such as load changes (for example, driving up a hill), or a scenario where there is not enough oxygen present to complete the regeneration (the delta pressure across the particulate filter indicates the regeneration progress and temperature sensors indicate, by the change in exothermic heat, the amount of regeneration time left to occur). If there is not enough oxygen present to complete the regeneration, as described above, the regeneration cycle may discontinue.

In some example embodiments, if the control module 48 (using the UHEGO sensor and delta pressure and/or temperature sensor) determines that regeneration will violate oxygen ($O_2$) stored limits in the catalytic converter 22 or particulate filter 26, then by estimation of how much time and amount of soot is remaining to be oxidized, the ECU may continue regeneration, but introduce leaner exhaust conditions overall or in timed intervals to supply the estimated amount of oxygen that would be needed to complete regeneration without having to cease regeneration and restart it again after supplying the same required amount of oxygen.

If false at 324, method 300 returns to 316. If true at 324, method 300 ends at 328.

Figure 7:
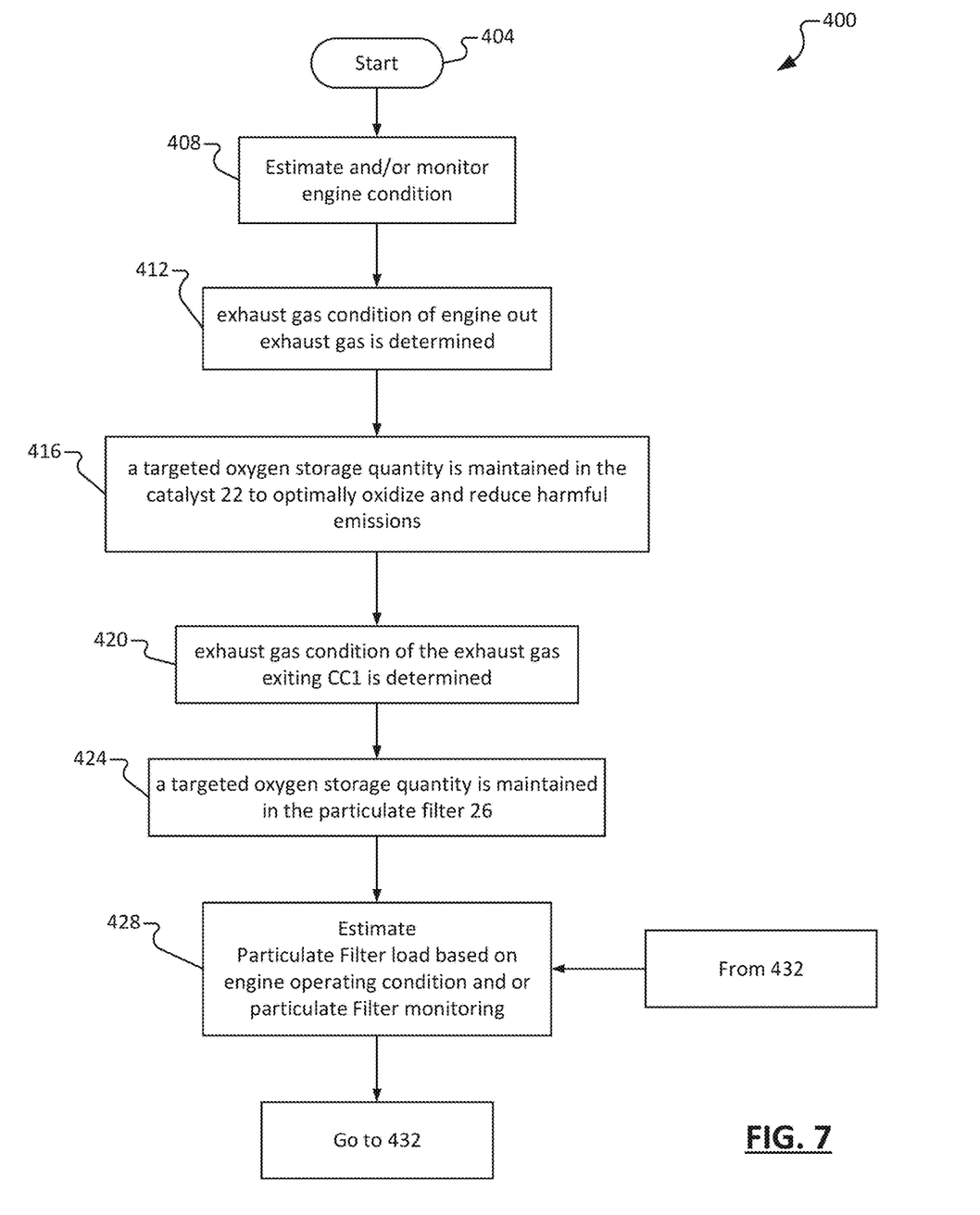
FIGS. 7 and 8 are a flowchart for another example method for operating the emission control system of FIG. 1.
Figure 8:
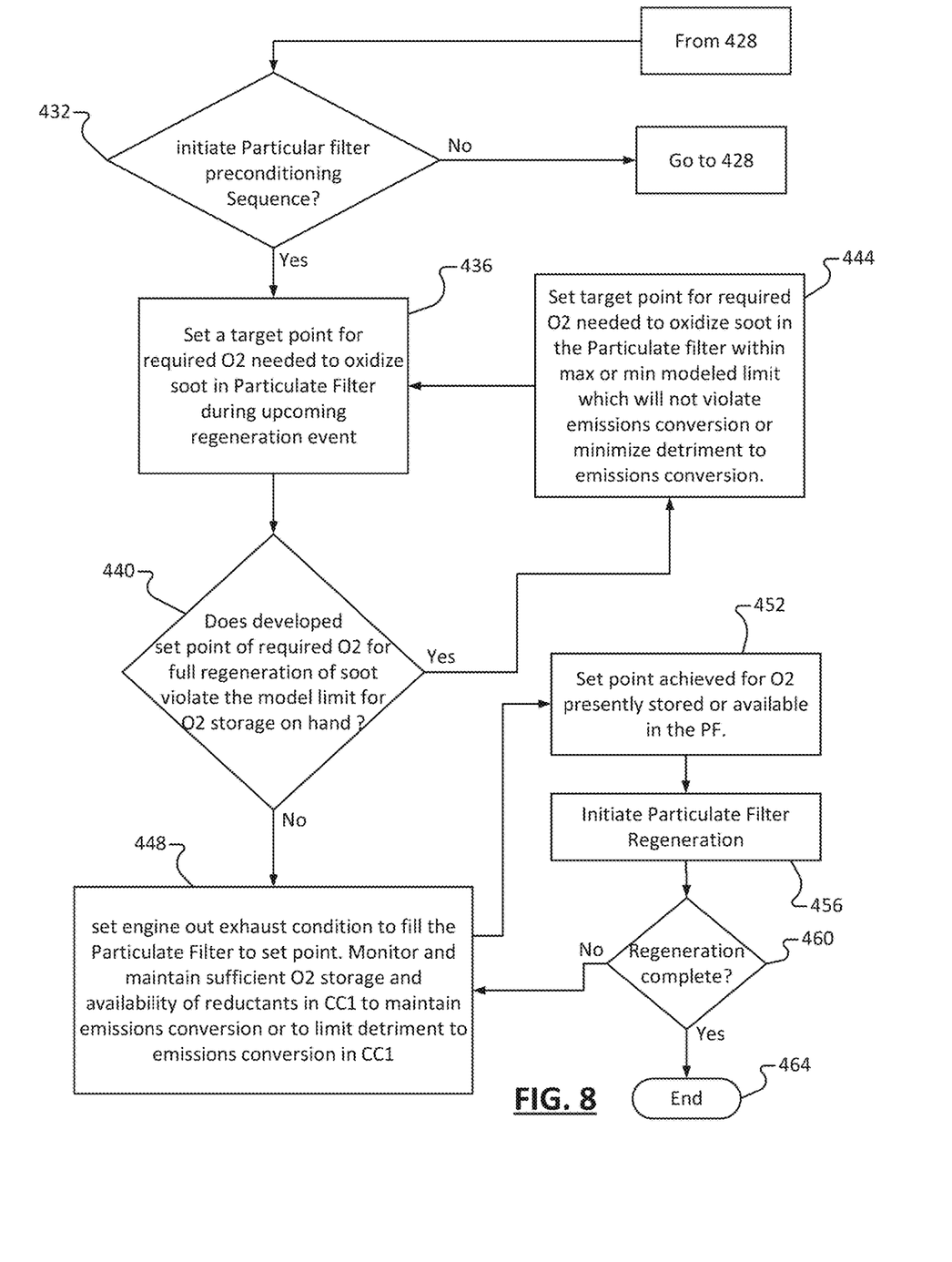

Now referring to FIGS. 7 and 8, an example method 400 for operating the emission control system 6 is illustrated. Method 400 starts at 404. At 408, the engine condition is estimated or monitored. For example, the control module 48 may determine an engine-on or engine-off condition (an operating state), a rich fueling or lean fueling condition (a fueling state), a loaded or unloaded condition (a load state), etc. of the engine.

At 412, the exhaust gas condition of the engine out exhaust gas is determined. For example, the upstream sensor (or first lambda sensor or first UHEGO sensor) 34 detects the exhaust gas condition of the exhaust gas exiting the engine 10 through the exhaust port 18. In some embodiments, the upstream sensor 34 may measure the amount of oxygen in the exhaust stream exiting the engine. In some embodiments, the upstream sensor 34 may measure an air-fuel ratio in the exhaust stream exiting the engine. The exhaust gas condition of the engine out exhaust gas may be reported to the control module 48.

At 416, a targeted oxygen storage quantity is maintained in the catalytic converter 22 to optimally oxidize and reduce harmful emissions. The targeted oxygen storage quantity may be determined by a model of oxygen storage and may be set to approximately half full, for example the OSC for the catalytic converter 22 may be maintained at about 50% (±10%). While this example embodiment is illustrated, it is understood that different applications may have different normal operation capacity percentages for safety margins or other reasons, and thus, the percentage value may vary in the range of ±20% or more.

For example, the oxygen storage quantity may be modeled using the following equation:

$$O_{in} = Ga\left[\frac{g}{s}\right] * \frac{AF - AF_{st}}{AF_{st}} * 0.232 * dt$$

where Ga is the intake air volume in grams per second (g/s), AF is the air-fuel ratio (A/F[–]) before the catalytic converter 22, and $AF_{st}$ is the catalytic converter stoichiometric air-fuel ratio (A/F[–]). The constant 0.232 represents the oxygen in the atmosphere, where air is pulled into the engine. While 0.232 is used in the above equation, it is understood that this number may be changed (for example, typically, oxygen ($O_2$) is recognized as comprising 21% of the atmosphere) based on the atmosphere or other variables.

At 420, the exhaust gas condition of the exhaust gas exiting the catalytic converter 22 is determined. For example, the second sensor (or second lambda sensor or second UHEGO sensor) 38 detects the exhaust gas condition of the exhaust gas exiting the catalytic converter 22. In some embodiments, the second sensor 38 may measure the amount of oxygen in the exhaust stream exiting the engine. In some embodiments, the second sensor 38 may measure an air-fuel ratio in the exhaust stream exiting the engine. The exhaust gas condition of the exhaust gas exiting the catalytic converter 22 may be reported to the control module 48.

At 424, a targeted oxygen storage quantity is maintained in the particulate filter 26. The targeted oxygen storage quantity may be determined by a model of oxygen storage and may be set to approximately half full, for example the OSC for the particulate filter 26 may be maintained at about 50% (±10%). While this example embodiment is illustrated, it is understood that different applications may have different normal operation capacity percentages for safety margins or other reasons, and thus, the percentage value may vary in the range of ±20% or more.

For example, the oxygen storage quantity may be modeled using the following equation:

$$O_{in} = Ga\left[\frac{g}{s}\right] * \frac{AF - AF_{st}}{AF_{st}} * 0.232 * dt$$

where Ga is the intake air volume in grams per second (g/s), AF is the air-fuel ratio (A/F[–]) before the catalytic converter 22, and $AF_{st}$ is the catalytic converter stoichiometric air-fuel ratio (A/F[–]).

At 428, a particulate filter 26 load is estimated based on engine operating conditions and/or particulate filter 26 monitoring. For example, the system, through one or more sensors 34, 38, 42, determines the amount of soot in the particulate filter 26, either through a change in pressure across the particulate filter 26 or by other methods.

Now referring to FIG. 8, at 432, it is determined whether to initiate a particulate filter preconditioning sequence. The determination may be made by comparing the particulate filter load condition with a set point trigger condition. For example, a determination of whether the particulate filter load condition is greater than a set point trigger condition to initiate a particulate filter preconditioning sequence may be made by the control module 48. For example, at 1 liter, the particulate filter 26 may have a maximum soot limit of 4.5 grams. However, the threshold capacity, or set point trigger condition, may be set to 3 grams. If the particulate filter 26 is allowed to exceed the threshold capacity or trigger condition, the exothermic reactions that occur during regeneration may induce thermal run away and damage, melting of the wall, and/or wall cracking. Thus, in this example, if the soot level is approaching the 3 gram trigger condition (for example, within about 0.5 grams, ±0.25 grams), the particulate filter preconditioning sequence may be initiated.

If false, method 400 returns to 428. If true, method 400 moves to 436. At 436, a target point for required oxygen needed to oxidize particulate matter (or soot) in the particulate filter during an upcoming regeneration event is determined. For example only, if 3 grams of particulate matter (mostly carbon) are trapped for oxidation, 6 grams of oxygen may be necessary to oxidize the particulate matter. To fully oxidize the soot (carbon) to $CO_2$, 1 carbon and 2 oxygen atoms are necessary (to form the $CO_2$). Thus, if there are 3 grams of soot, then 6 grams of oxygen (i.e., 2 times the amount of carbon) are necessary.

In some embodiments, the target point may be modeled using the following equation:

$$O_{in} = Ga\left[\frac{g}{s}\right] * \frac{AF - AF_{st}}{AF_{st}} * 0.232 * dt$$

where Ga is the intake air volume in grams per second (g/s), AF is the air-fuel ratio (A/F[–]) before the catalytic converter 22, and $AF_{st}$ is the catalytic converter stoichiometric air-fuel ratio (A/F[–]). The constant 0.232 represents the oxygen in the atmosphere, where air is pulled into the engine. While 0.232 is used in the above equation, it is understood that this number may be changed (for example, typically, oxygen ($O_2$) is recognized as comprising 21% of the atmosphere) based on the atmosphere or other variables.

At 440, a determination of whether the developed set point of required oxygen for full regeneration of particulate matter violates the model limit for oxygen storage. The model limit for oxygen storage on hand may be the limit required to maintain balanced reduction of Nitrous Oxide (NOx) or emissions requiring reduction during the regeneration event. For example, the minimum model limit for oxygen storage on hand may be about 20% (±10%) and the maximum model limit for oxygen storage on hand may be about 80% (±10%). However, while this example embodiment is discussed, it is understood that different applications may have different model limits for oxygen storage on hand, and thus, the percentage value may vary in the range of ±20% or more.

If true at 440, method 400 proceeds to 444. At 444, a new target point for required oxygen needed to oxidize particulate matter in the particulate filter 26 within a maximum or minimum modeled limit is set. The new target point will not violate emissions conversion or minimize detriment to emissions conversion. For example, if the model limit for oxygen storage exceeds the maximum model limit, the new target point for required oxygen may be set at the maximum model limit or within a range (such as 0-10%) less than the maximum model limit. Additionally, if the model limit for oxygen storage is less than the minimum model limit, the new target point for required oxygen may be set at the minimum model limit or within a range (such as 0-10%) greater than the maximum model limit. The method 400 then returns to 436.

If false at 440, method 400 proceeds to 448. At 448, the engine out exhaust condition is set to fill the particulate filter 26 with oxygen to the target point for required oxygen needed to oxidize. For example, the control module 48 may command the fueling and other engine operating conditions to a lean operation to fill the particulate filter 26 with oxygen until the oxygen levels reach the target point. The UHEGO or lambda sensors 34 and 38 may monitor the exhaust gas and provide feedback on the oxygen storage in the particulate filter 26. Further, the UHEGO or lambda sensors 34 and 38 may maintain sufficient oxygen storage and availability of reductants in the catalytic converter 22 to maintain emissions conversion or to limit detriment to emissions conversion in the catalytic converter 22.

For example, referring to FIG. 3, during the pre-regeneration operating phase, the air-fuel ratio, or lambda, is controlled to target lean fueling (i.e., above the lambda=1 line). For example, the control module 48, or fuel control module 58, targets fueling to achieve the lean air-fuel ratio. The highlighted area in phase 2 is developed and executed based on a model which understands the amount of oxygen storage capacity for each of the catalytic converter 22 and particulate filter 26. Further, the model understands the reaction rate of adsorption versus desorption of oxygen into and out of each catalytic converter 22 and particulate filter within a variety of exhaust conditions, for example, as shown in FIG. 4.

Phase 2 and the highlighted area of phase 2 allows a targeted abundance of oxygen in the exhaust for a designated set of time. This allows the particulate filter 26 to absorb sufficient oxygen to support oxidation of the modelled material currently trapped in the particulate filter 26. It further allows sufficient oxygen to be stored in the particulate filter 26 for the duration of the upcoming rich regeneration event. This protects against untreated hydrocarbons passing through the aftertreatment device 46 to the tailpipe 48.

As shown in FIG. 5B, during the pre-regeneration phase, the oxygen storage capacity (OSC) for the catalytic converter 22 and the particulate filter 26 is maintained at a minimum, for example the catalytic converter 22 OSC may be maintained at about 0% (±5%) and the OSC for the particulate filter 26 may be maintained at about 20% (±10%). While these example embodiments are illustrated, it is understood that different applications may have different minimum capacity percentages for safety margins or other reasons, and thus, the percentage value may vary in the range of ±20% or more. In other words, the oxygen stored in the catalytic converter 22 may be at full capacity, or about 100% (±10%) full, and the oxygen stored in the particulate filter 26 may be at full capacity, or about 80% (±10%) full.

At 452, the target point for the oxygen stored or available in the particulate filter 26 is achieved. Additionally, at an end of the pre-regeneration phase, the catalytic converter 22 has sufficient supply of oxygen to oxidize the increase in un-combusted and partially combusted hydrocarbons during the rich regeneration event by utilizing the same modeling process.

At 456, particulate filter regeneration is initiated. During particulate filter 26 regeneration, the system operates in a filter regeneration phase, as illustrated as phase 3 in FIGS. 3 and 5C. Referring to FIG. 3, during the filter regeneration phase, the air-fuel ratio, or lambda, is controlled to target rich fueling (i.e., below the lambda=1 line). For example, the control module 48, or fuel control module 58, targets fueling to achieve the rich air-fuel ratio. The rich air-fuel ratio adds unburned fuel to the particulate filter 26 which reacts with the heated exhaust gas (for example, at approximately 600° C., ±10° C.) to burn the particulate matter trapped in the particulate filter 26.

As illustrated in FIG. 5C, the oxygen storage capacity (OSC) for the catalytic converter 22 and the particulate filter 26 is a maximum, for example the catalytic converter 22 OSC may be maintained at about 100% (±10%) and the OSC for the particulate filter 26 may be maintained at about 80% (±10%). While these example embodiments are illustrated, it is understood that different applications may have different maximum capacity percentages for safety margins or other reasons, and thus, the percentage value may vary in the range of ±20% or more. In other words, the oxygen stored in the catalytic converter 22 and particulate filter 26 may be at a minimum, about 0%, ±5%, (or empty) in the catalytic converter 22 and about 20%, ±10%, (or near empty) in the particulate filter 26.

At 460, method 400 determines whether the regeneration was completed. For example, the control module 48 may determine whether regeneration has been completed. In some example embodiments, there may be several reasons, one of which could prevent regeneration from completing. These reasons may include a scenario where different fueling is necessary, such as load changes (for example, driving up a hill), or a scenario where there is not enough oxygen present to complete the regeneration (the delta pressure across the particulate filter indicates the regeneration progress and temperature sensors indicate, by the change in exothermic heat, the amount of regeneration time left to occur). If there is not enough oxygen present to complete the regeneration, as described above, the regeneration cycle may discontinue.

In some example embodiments, if the control module 48 (using the UHEGO sensor and delta pressure and/or temperature sensor) determines that regeneration will violate oxygen ($O_2$) stored limits in the catalytic converter 22 or particulate filter 26, then by estimation of how much time and amount of soot is remaining to be oxidized, the ECU may continue regeneration, but introduce leaner exhaust conditions overall or in timed intervals to supply the estimated amount of oxygen that would be needed to complete regeneration without having to cease regeneration and restart it again after supplying the same required amount of oxygen.

If false at 460, method 400 returns to 448. If true at 460, method 400 ends at 464.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust system comprising:
a catalytic converter;
a particulate filter disposed adjacent to and downstream of said catalytic converter;
a first sensor disposed upstream of said catalytic converter, said first sensor providing an output identifying a quantity of oxygen in an exhaust flow;
a second sensor disposed downstream of said catalytic converter and upstream of said particulate filter, said second sensor separating said particulate filter from said adjacent catalytic converter and said second sensor providing an output identifying a quantity of oxygen in said exhaust flow exiting said catalytic converter and entering said particulate filter; and
a controller configured to model a remaining storage capacity for oxygen in said catalytic converter and a remaining storage capacity for oxygen in said particulate filter from an intake air volume, an air-fuel ratio, and a stoichiometric air-fuel ratio, said intake air volume and said stoichiometric air-fuel ratio being predetermined values stored in said controller, and said first sensor being configured to measure said air-fuel ratio of said exhaust flow upstream of said catalytic converter.

2. The exhaust system of claim 1, wherein said controller is configured to receive said quantity of oxygen in said exhaust flow at said first sensor and said quantity of oxygen in said exhaust flow at said second sensor and determining an amount of oxygen stored in said catalytic converter and determining an amount of oxygen available to said particulate filter using said quantity of oxygen in said exhaust flow at said first sensor and said quantity of oxygen in said exhaust flow at said second sensor, and
said controller is configured to determine a remaining storage capacity for oxygen in said catalytic converter and a remaining storage capacity for oxygen in said particulate filter using said amount of oxygen stored in said catalytic converter and said amount of oxygen stored in said particulate filter.

3. The exhaust system of claim 2, wherein said controller is configured to maintain said remaining storage capacity for oxygen in said particulate filter at 50% during a normal operation phase, 20% during a pre-regeneration phase, and 80% during a regeneration phase.

4. The exhaust system of claim 2, wherein said controller is configured to command fueling to lean to fill said particulate filter with oxygen during a pre-regeneration phase.

5. The exhaust system of claim 2, wherein said controller is configured to command fueling to rich during a regeneration phase.

6. The exhaust system of claim 1, wherein said first sensor and said second sensor are universal heated exhaust gas oxygen sensors.

7. The exhaust system of claim 1, wherein said first sensor and said second sensor are lambda sensors.

8. The exhaust system of claim 1, wherein said catalytic converter is a three-way catalyst.

9. The exhaust system of claim 1, further comprising an aftertreatment device disposed downstream said exhaust flow from said particulate filter.

10. A method of controlling an exhaust system comprising:
catalyzing, with a catalytic converter, hydrocarbons and nitrous oxide from an exhaust flow from an engine;

filtering, with a particulate filter disposed adjacent to and downstream of said catalytic converter, particulate matter from said exhaust flow;

detecting, with a first sensor disposed upstream of said catalytic converter, a quantity of oxygen in said exhaust flow;

detecting, with a second sensor disposed downstream of said catalytic converter and upstream of said particulate filter, a quantity of oxygen in said exhaust flow exiting said catalytic converter and entering said particulate filter, said second sensor separating said particulate filter from said adjacent catalytic converter; and modeling, with a controller, a remaining storage capacity for oxygen in said catalytic converter and a remaining storage capacity for oxygen in said particulate filter from an intake air volume, and air-fuel ratio, and a stoichiometric air-fuel ratio, said intake air volume and said stoichiometric air-fuel ratio being predetermined values stored in said controller, and said first sensor being configured to measure said air-fuel ratio of said exhaust flow upstream of said catalytic converter.

11. The method of claim 10, further comprising determining, with said controller, an amount of oxygen stored in said catalytic converter and an amount of oxygen available to said particulate filter using said quantity of oxygen in said exhaust flow at said first sensor and said quantity of oxygen in said exhaust flow at said second sensor; and determining said remaining storage capacity for oxygen in said catalytic converter and said remaining storage capacity for oxygen in said particulate filter using said amount of oxygen stored in said catalytic converter and said amount of oxygen available to said particulate filter.

12. The method of claim 11, further comprising maintaining, with said controller, said remaining storage capacity for oxygen in said particulate filter at 50% during a normal operation phase, 20% during a pre-regeneration phase, and 80% during a regeneration phase.

13. The method of claim 11, further comprising commanding, with said controller, fueling to lean to fill said particulate filter with oxygen during a pre-regeneration phase.

14. The method of claim 11, further comprising commanding, with said controller, fueling to rich during a regeneration phase.

15. The method of claim 10, wherein said first sensor and said second sensor are universal heated exhaust gas oxygen sensors.

16. The method of claim 15, further comprising:

regenerating the particulate filter, the regenerating including oxidizing the particulate matter collected in the particulate filter;

measuring, by the second sensor; the exhaust exiting the catalytic converter during the regeneration of the particulate filter;

determining, by the controller, whether there will be enough oxygen to complete the regeneration based on the measurement from the second sensor;

discontinuing, by the controller, the regeneration when there is not enough oxygen to complete the regeneration;

fueling, by the controller, at a lean lambda condition to fill the catalytic converter and particulate filter with oxygen; and resuming, by the controller, regeneration when the catalytic converter and particulate filter are filled with oxygen.

17. The method of claim 15, further comprising:

regenerating the particulate filter, the regenerating including oxidizing the particulate matter collected in the particulate filter;

measuring, with at least one of the universal heated exhaust gas oxygen sensors, a pressure sensor, and a temperature sensor, a lambda, a temperature, or a pressure;

determining, with the controller, whether the regeneration of the particulate filter will violate oxygen stored limits in the catalytic converter or the particulate filter;

introducing, by the controller, a leaner exhaust condition either overall or in a timed interval to supply the remaining oxygen for the regeneration of the particulate filter.

18. The method of claim 10, further comprising treating, with an aftertreatment device disposed downstream from said particulate filter, said exhaust flow exiting said particulate filter.

* * * * *

UNITED STATES PATENT AND TRADEMARK OFFICE
CERTIFICATE OF CORRECTION

| | | |
|---|---|---|
| PATENT NO. | : 10,865,676 B1 | Page 1 of 1 |
| APPLICATION NO. | : 16/505131 | |
| DATED | : December 15, 2020 | |
| INVENTOR(S) | : Edward Szczepanski | |

It is certified that error appears in the above-identified patent and that said Letters Patent is hereby corrected as shown below:

In the Claims

Column 20, Line 62: In Claim 9, delete "aftertreament" and insert --aftertreatment-- therefor Column 21, Line 22: In Claim 11, after "comprising", insert --¶--

Column 22, Line 8: In Claim 16, delete "sensor;" and insert --sensor,-- therefor Signed and Sealed this
Ninth Day of March, 2021

Drew Hirshfeld
*Performing the Functions and Duties of the
Under Secretary of Commerce for Intellectual Property and
Director of the United States Patent and Trademark Office*